Nov. 4, 1930.　　　　　E. DYMENT　　　　　1,780,381
TIRE DISPLAY STAND
Filed Dec. 6, 1928　　　2 Sheets-Sheet 1
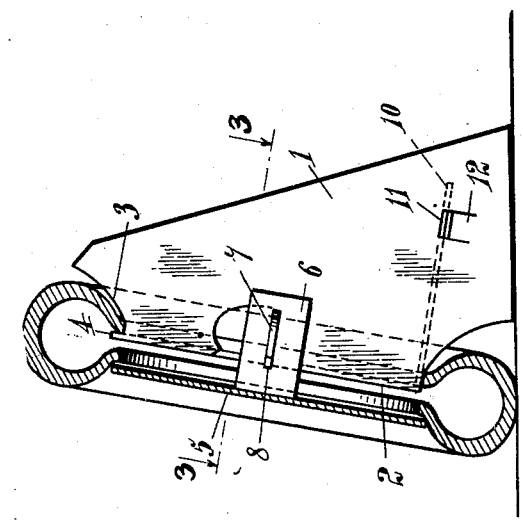
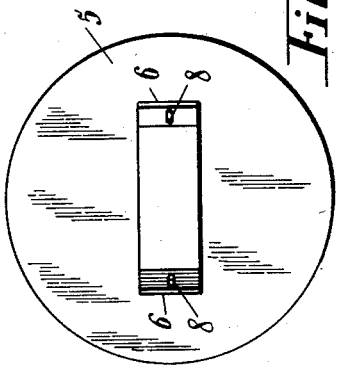
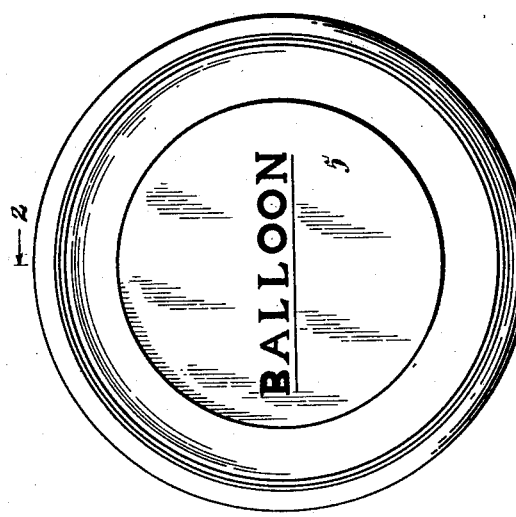
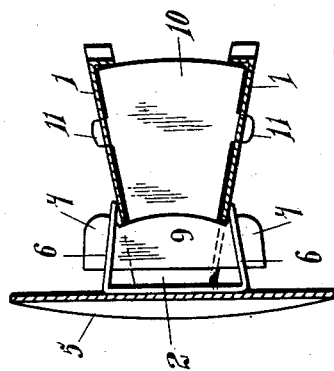
Inventor
E. Dyment

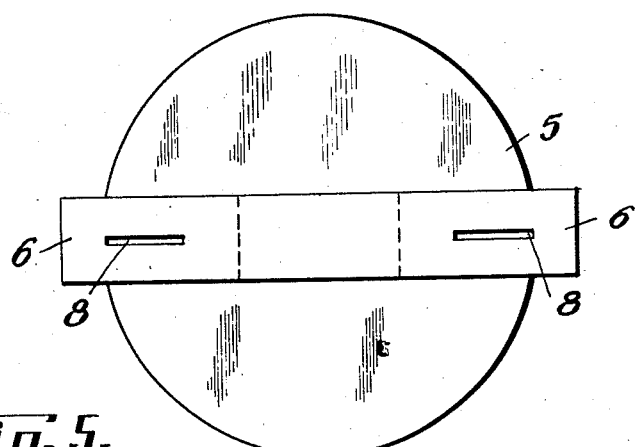
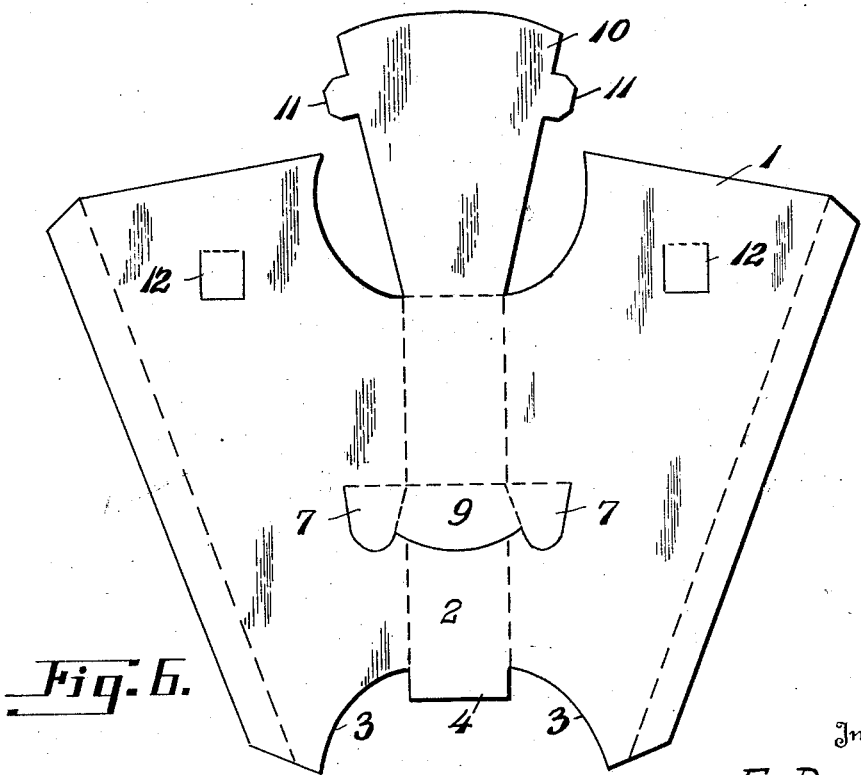

Patented Nov. 4, 1930

1,780,381

UNITED STATES PATENT OFFICE

ELWOOD DYMENT, OF LAKEWOOD, OHIO, ASSIGNOR TO THE DYMENT COMPANY, OF CLEVELAND, OHIO, A CORPORATION

TIRE-DISPLAY STAND

Application filed December 6, 1928. Serial No. 324,206.

This invention has to do with so-called tire holders, which are devices formed of cardboard or other similar sheet material, and designed primarily to assist in the display of tires. In holding a tire in an inclined or upraised position for display purposes by the use of a tire holder, it is desirable to avail of an insert which fits in the opening defined by the tire, and which may carry writing or any type of indicia which constitutes advertising matter. An object in view is to provide a simple knockdown tire holder which cooperates with a tire insert as above noted, and which will support the tire in its display position in such a manner that the tire holder is practically hidden by the tire and the tire insert when they are on display.

In carrying out my idea, I avail of an easel-like construction which is made from a blank of sheet material. The blank is so shaped and cut that when properly folded, in accordance with my inventive thoughts, a seat is provided from which the tire may be suspended. In addition, folding of the easel blank provides arms which cooperate with certain projections on the tire insert by interlocking therewith to hold the insert against the tire whereby the latter is held in position.

With these and other objects in view, as will in part become apparent and in part be hereinafter stated, the invention comprises certain novel constructions, combinations, and arrangements of parts, which will be subsequently specified and claimed.

For a full and more complete understanding of the invention, reference may be had to the following descriptions and accompanying drawings, wherein Figure 1 is a front view showing a tire with the insert applied therein, held in position by my novel tire holder.

Figure 2 is a view from the side taken about on the line 2—2 of Figure 1, parts being shown in section and parts in elevation.

Figure 3 is a horizontal section taken about on the line 3—3 of Figure 2, the tire being omitted.

Figure 4 is a view of the tire insert with the projections bent into position wherein they are adapted to be engaged by the easel.

Figure 5 is a view of the insert blank prior to bending the supporting projections into operative position, and Figure 6 is a plan view of the easel blank prior to its being folded to provide the finished easel.

While a preferred specific form of the invention is herein set forth, it is to be understood I am not to be limited to the exact constructions illustrated and described because various modifications of these details may be provided in putting the invention into practice within the purview of the appended claims.

The easel forming the tire-holder is made of stout sheet material, such as cardboard, and comprises the sides 1 and the front 2. The sides at their upper end are cut out to form the seats 3 for the article to be displayed, while the front 2 has a lip 4 formed at its upper end which, when the object to be displayed is a tire, fits between the beads of the tire.

Preferably the front 2 inclines rearwardly at substantially the angle of inclination desired for the object displayed and the disk or insert 5 fitted against the front of the object. The lower part of the front and the forward parts of the lower ends of the sides are cut away to partly receive the object as shown.

The disk 5 is of such a diameter that it engages the object, if the latter be a tire, close to the outer bead. This disk or insert is adapted to carry a suitable display advertisement. The disk is held in position by means of the flaps 6, which have a hinge connection with the disk and are adapted to extend rearwardly adjacent the sides 1 of the easel. Preferably the flaps 6 are formed from an integral strip of cardboard, the center part of which is glued to the back of the disk. The ends of this strip are readily bent rearwardly to form the flaps 6, the strip of cardboard being preferably creased to facilitate the bending. These flaps may be engaged in any suitable manner with the easel. Preferably lugs 7 are formed on the easel and the flaps 6 have slots 8 formed therein through which the lugs 7 may pass.

In the preferred form the lugs 7 are formed by the projecting ends of a transverse member 9 cut out of the front and sides of the easel when the sides and front are lying flat in the same plane. From this it follows that, when the sides are bent to the position shown in the drawings, the ends of the transverse member 9 are left projecting.

As a stiffener for the easel I prefer to form the brace 10 integral with the front 2, which brace is bent up to an approximately horizontal position. This brace is provided with lugs 11, which lugs are adapted to pass through U-shaped cuts 12 formed in the sides 1 as shown.

It will be seen that Figures 5 and 6 show the insert and the easel portion as separate members formed from separate blanks. However, when the entire display device is assembled with a tire, these parts function substantially as one, and form what is in effect a unitary structure, this being due to the interlock between the flaps 6 and the lugs 7.

From the above description it will be seen that I have devised a construction of display stand which will satisfactorily attain the object of my invention as set out in the preamble of this specification.

While I have disclosed a disk-like member to engage the outer side of the object supported by the easel, I do not wish to be limited to the employment of this particular form of member since a member in the shape of a cross or having some fanciful shape might be employed. Again, the member engaging the outer side of the tire or similar object might comprise merely a series of divergent arms, or it might have the form of a disk encircled by the tire with members extending therefrom to engage the outer part or flange of the tire.

In like manner, it is obvious that while I have a very useful and advantageous form of easel, it is within the purview of my invention that different folding types may be utilized.

Having thus described my invention, what I claim as new and desire to secure by Letters Patent of the United States, is:

1. In combination an easel having means at its upper end to engage within the upper part of an annular object and comprising sheet material bent to form a front and sides; a disk adapted to engage the outer side of said object to close the opening therein; flaps hingedly connected with the disk and turned back towards the sides of the easel; and lugs integral with and projecting from said sides of the easel, with which lugs said flaps are interlocked.

2. In combination an easel having means at its upper end to engage within the upper part of an annular object and comprising sheet material bent to form a front and sides; a disk adapted to engage the outer side of said object to close the opening therein; flaps hingedly connected with the disk and turned back towards the sides of the easel; and a cross member partly cut out of the front and sides of the easel and having lugs projecting laterally beyond the sides, said flaps aforesaid having slots therein through which the lugs extend.

3. In combination an easel having means at its upper end to engage within the upper part of an annular object and comprising sheet material bent to form two side members and an upright member connecting the side members; a disk adapted to engage the outer side of the said object to close the opening therein; locking means formed of a strip of sheet material secured to the center of the disk and having rearwardly extending flaps; and means for detachably securing said flaps to the side members of the easel.

In testimony whereof I affix my signature.

ELWOOD DYMENT.